FIG_5_

INVENTOR.
Ellsworth W. Austin
BY Marcus Lothrop
ATTORNEY.

June 11, 1940.  E. W. AUSTIN  2,204,033
EARTH MOWER
Filed Oct. 5, 1936  6 Sheets-Sheet 6

INVENTOR.
Ellsworth W. Austin
BY Marcus Lothrop
ATTORNEY.

Patented June 11, 1940

2,204,033

UNITED STATES PATENT OFFICE 2,204,033

EARTH MOVER

Ellsworth W. Austin, Cedar Rapids, Iowa, assignor to La Plant-Choate Manufacturing Company, Incorporated, Cedar Rapids, Iowa, a corporation of Delaware Application October 5, 1936, Serial No. 103,972

22 Claims. (Cl. 37—126)

My invention relates to means adapted to be propelled over the ground, usually by another vehicle such as a tractor, for the purpose of excavating, picking up, carrying and discharging material to be moved, such as earth, and is especially concerned with devices of this character particularly adapted for use in moving relatively large quantities of material.

An object of my invention is to provide an earth mover which is capable of receiving and carrying several loads of material simultaneously.

Another object of my invention is to provide an earth mover which will excavate and carry a succession of loads of material.

A further object of the invention is to provide an earth mover which will discharge the carried material positively, and in selected portions.

Another object of the invention is to provide an earth mover which is capable of operation in various directions of loading and discharge.

An additional object of the invention is to provide an earth mover which can be completely controlled from a remote point.

The foregoing and other objects are attained in the embodiments of the invention illustrated in the drawings, in which.

In its preferred form, the earth mover of my invention includes a frame supported on ground-engaging members, and supporting a carrier bottom with which is associated an earth barrier movable along said carrier bottom and into a position spaced away therefrom, the barrier being adapted to cooperate with an apron which extends across one end of the carrier bottom and is movable between a position adjacent the carrier bottom and another position spaced away therefrom.

While the earth mover of my invention can be embodied in many different forms and is capable of use in sundry ways and with many materials other than earth, it is conveniently illustrated by two modifications disclosed herein and described as they find utility in the moving of earth. One of the problems of major importance in an earth mover is to carry as much earth as is feasible with the draft power available, since the carrying capacity of an earth mover is usually limited by the amount of excavating or scraping that can be done with the available power. It is economically advisable to have an earth mover of a size sufficient to utilize all or nearly all of the power available from the propelling implement, which customarily is a tractor.

When an earth mover is engaged in scraping up earth and receiving the earth for carriage to another point, it can be operated only until a predetermined load of material is accumulated for carrying. The scraping device of itself is perfectly capable of continuing to engage and scrape additional earth for carriage, but the power available to displace the accumulated load by means of the material being scraped is not sufficient and scraping ceases when a predetermined load has been accumulated immediately behind or adjacent the scraper blade. This factor imposes a limitation on the capacity of the carrier to transport excavated material. In the present instance, I provide means for removing accumulations of excavated earth from adjacent the blade to a more remote carrying position, so that the ability of the excavating edge to remove and receive additional earth for carrying purposes is substantially undiminished until such time as the earth mover is loaded to the maximum load drawing capacity of the draft device.

In an earth mover carrying a large quantity of earth, it is sometimes desirable to discharge the entire load as quickly as possible at a given location, and at other times it is desirable to discharge the load slowly and relatively uniformly over a large area so that the earth mover is utilized, in effect, as a spreader. My invention includes means for discharging the load either very quickly and positively in a predetermined location or, alternatively, slowly and uniformly over a wide area so that the machine acts as a spreader.

Figure 1:
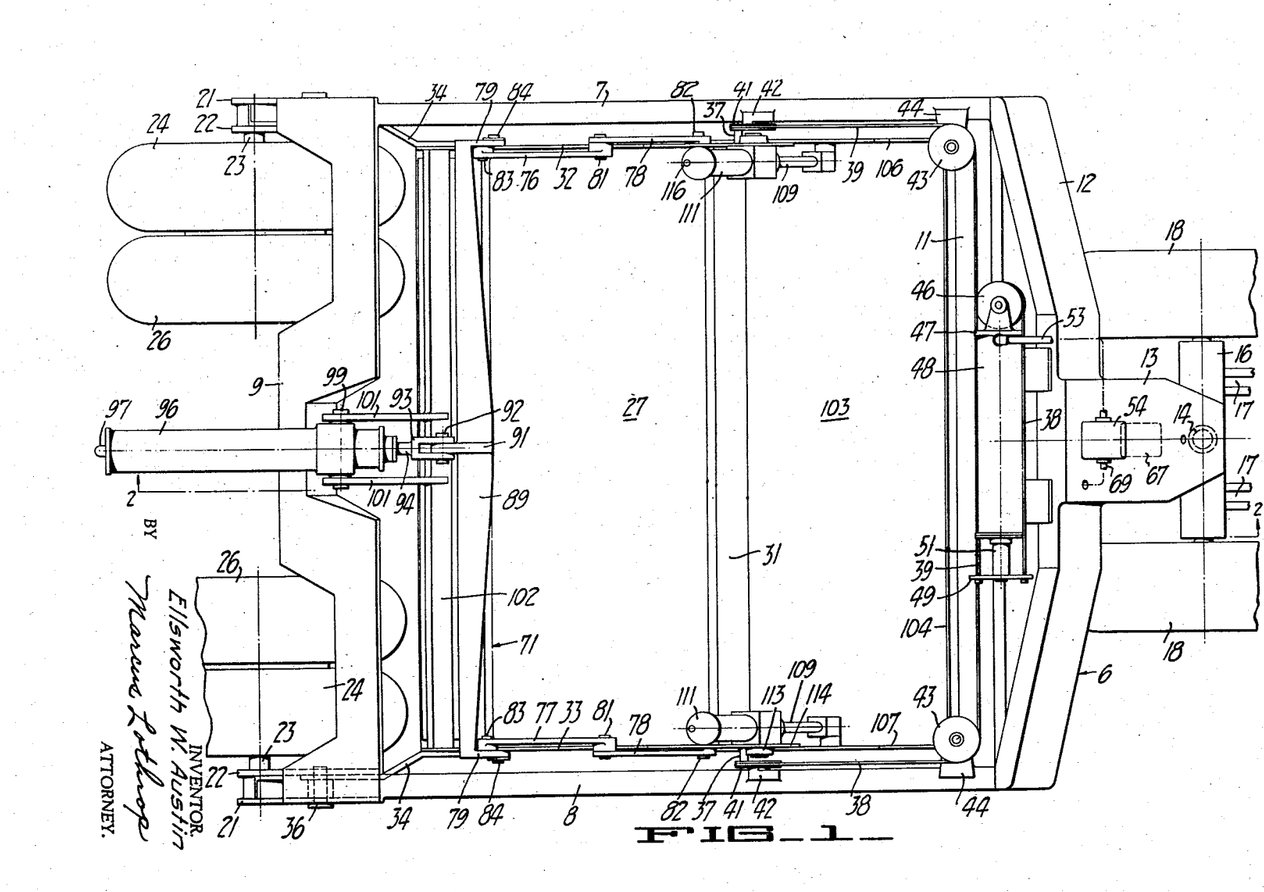
Fig. 1 is a plan of one form of earth mover in accordance with my invention.
Figure 2:
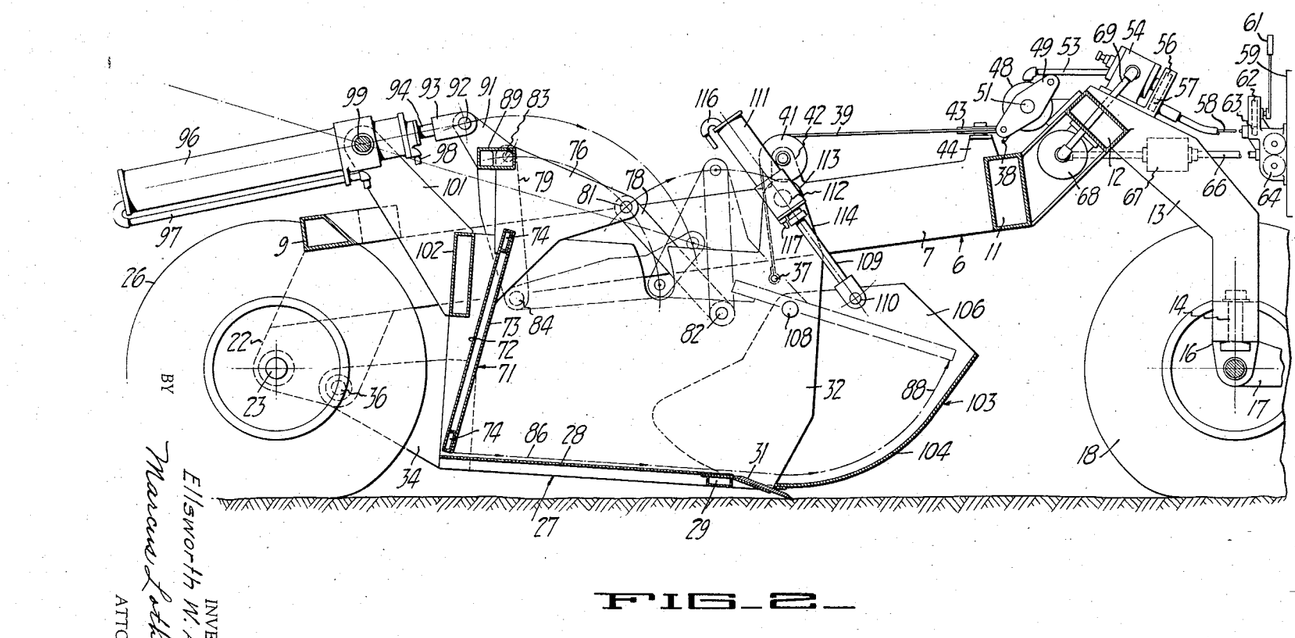
Fig. 2 is a cross-section the planes of which are indicated by the lines 2—2 of Fig. 1.

In the form of earth mover of my invention, particularly illustrated in Figs. 1 and 2, which is ordinarily although not necessarily constructed in a somewhat smaller carrying capacity than the machine disclosed in Figs. 3 to 9, inclusive, I preferably provide a main frame 6 comprised of side beams 7 and 8 spanned at their rearward ends by a cross-beam 9 and at their forward ends by a cross-beam 11. In addition to the cross-beam 11, the forward end of the frame includes an arch beam 12 merging with a central horn 13 carrying a pivotal connection 14 to a front axle 16.

To the front axle 16 is attached a draft connector 17 extending to any suitable source of draft power, such as a tractor, and likewise carried by the axle 16 are ground-engaging members such as pneumatically tired wheels 18. The axle 16 and the wheels 18 rotate about the substantially vertical pivot mechanism 14 under the influence of the draft connector 17, and can cut under the arch beam 12 and the horn 13 in such a way that the frame 6 can be drawn in any selected direction.

The suspension of the other end of the frame 6 is provided by axle plates 21 and 22 projecting in substantially parallel spaced relationship from the side beams 7 and 8, and together supporting a pair of stub axles 23 in axial alignment and directed toward each other. Each of the stub axles 23 preferably supports for rotation, a pair of ground-engaging members, such as pneumatically tired wheels 24 and 26, respectively.

Supported on the frame 6 is an earth carrier, generally designated 27. This carrier incorporates a carrier bottom 28, preferably constituted of a planar metal sheet suitably reinforced by a channel 29 and at its forward edge carrying an earth-engaging cutting blade 31. The carrier bottom 28, along each side, is secured to the adjacent one of a pair of carrier sides 32 and 33 which are arranged in substantially parallel relationship upstanding from the bottom 28, thus forming a container having a bottom and two sides for restraining the carried material but open at the forward and rearward ends.

In order that the earth carrier 27 can be suitably moved with respect to the frame 6, I preferably weld to each of the sides 32 and 33, a projecting plate 34 which is offset to extend between the plates 21 and 22 wherein it is rotatably anchored by a pivot pin 36 so that the carrier 27 can be pivoted about a generally horizontal, transverse axis with respect to the frame 6.

For effecting the relationship or pivotal raising and lowering of the carrier 27 with respect to the ground and with respect to the frame 6, each of the carrier sides 32 and 33 carries a projecting lug 37 around which is anchored the terminal of one of a pair of flexible cables 38 and 39 which form part of an actuating mechanism. The cables 38 and 39 extend upwardly around pulleys 41 rotatably journaled in lugs 42 upstanding from the side beams 7 and 8 and then extend around comparable pulleys 43 journaled in boxes 44 upstanding from the side beams 7 and 8. The cable 38 then passes around a pulley 46 rotatably mounted on the stationary head 47 of a cylinder 48 mounted on the arch beam 12, and is fastened to a cross-head 49. The other cable 39, after passing around the pulley 43, is secured to the other end of the cross-head 49. A piston rod 51, extending to a suitable piston (not shown) within the cylinder 48, is fastened to the cross-head 49, so that movement of the piston within the cylinder 48 produces comparable movement of the cables 38 and 39 and either raises the earth carrier 27 with respect to the frame 6 and to the ground or permits it to lower gravitationally.

The supply of actuating fluid, preferably an hydraulic liquid, for operating the cylinder 48 is conducted thereto through a conduit 53 under the control of a valve 54. The valve preferably has a rotatable core (not shown) mounted to revolve with a gear 56 meshing with a pinion 57 at one end of a flexible shaft 58. The flexible shaft extends to an appropriate point for control, preferably on the rear end of the draft vehicle 59, or at some point convenient to the operator thereof. On the draft vehicle is provided a control handle 61 which operates a control gear 62 meshing with a pinion 63 on the flexible shaft 58. This arrangement provides a movement of the valve 54 directly in accordance with the movement of the control handle 61, but, due to the interposition of the gear trains, the flexible shaft 58 which actually transmits the motion from the tractor 59 to the earth carrier is moved at a relatively high speed but a low load, so that it can be quite light and flexible to accommodate for all differences in movement between the tractor and the drawn vehicle, without interfering with precise control of the valve. While a unitary valve is shown, for this purpose a plurality of valves conjointly or separately controlled by separate handles may be utilized.

Preferably, the supply of hydraulic fluid under pressure is furnished by a pump 64 on the tractor and suitably driven thereby, and is conducted through one or more conduits 66 to a regulator 67 which is preferably operated as a by-pass, relief valve or otherwise to maintain any set pressure or range of pressures, and passes into an accumulation chamber or tank 68 from which it is conducted through a pipe 69 to the control valve 54. This arrangement provides a substantially continuous, light load pumping action by the pump 64, to maintain a predetermined pressure or range of pressures in the accumulator 68, and avoids spasmodically and suddenly imposing a large load on the tractor engine to operate an enlarged pump like the pump 64 at full capacity. By suitable operation of the control lever 61, an operator can control smoothly and with facility the raising and lowering of the carrier 27 and consequently the position of the blade 31 with respect to the ground, and thus can control the charging and discharging of material from the carrier bottom 28.

When the carrier is being loaded, the material engaged or scraped by the advancing blade 31 accumulates on the forward portion of the carrier bottom 28 immediately behind the blade 31 until such time as it is forced rearwardly by additional, accumulating material. The movement of the material rearwardly on the carrier bottom, because of the pressure of the subsequently gathered material, continues until the pressure of the gathering material is not sufficient to displace the earth which rests upon the carrier bottom 28. The material which has been gathered can be termed a "load" and it can arbitrarily be said that one load has been accumulated. While the excavation and accumulation of the load may have entailed the use of virtually the maximum tractor power, nevertheless the transportation or carriage of the accumulated load does not require the exertion of maximum power from the tractor.

In accordance with my invention, I provide means for displacing an accumulated load of earth along the carrier bottom 28 to make way immediately behind the blade 31 for an additional load or for additional loads of earth. The movement or displacement of the accumulated material is effected by an earth barrier 71 which preferably is a generally planar structure comprised of a pair of plates 72 and 73 suitably reinforced by channels 74. The barrier normally extends in a substantially vertical plane and is located between the side plates 32 and 33. To determine a suitable path of movement of the barrier 71—namely, a path of movement which is substantially rectilinear for the most part but which terminates in an arc, or in other words, which provides a movement for the most part substantially parallel with the carrier bottom 28—I preferably fasten the barrier 71 to a pair of approximately triangular head plates 76 and 77. Each of the head plates 76 and 77 is supported upon its respective pair of links 78 and 79.

One of the links 78 is connected by a pivot pin 81 to the forward part of the head plate 76, and is likewise fastened by a pivot pin 82 to the side plate 32, while the link 79 is connected by a pivot pin 83 to the upper portion of the head plate 76 and by a pivot pin 84 to the side plate 32. Similar connections are interposed between the head plate 77 and the side plate 33. The length of the links and the relative positioning of the pivot points on the side plates and head plates is such that the lower end of the earth barrier 71 moves substantially in the path indicated by the series of arrows 86 in Fig. 2, the portion immediately adjacent the carrier bottom 28 being a substantially rectilinear or straight path and the final portion 88 being substantially an arc. Thus, the barrier 71 in effect sweeps the entire space between the side plates 32 and 33 and, after passing the cutting edge 31, ascends until it is spaced materially away from the bottom plate 28 and occupies substantially a horizontal position.

Appropriately to actuate the barrier 71 in both directions, I preferably span the head plates 76 and 77 by a crossbeam 89 of box construction, adjacent the center of which an apertured ear 91 projects. Fastened by a pivot pin 92 to the ear is a yoke 93 mounted on a piston rod 94 extending from a cylinder 96. The piston (not shown) is operated within the cylinder 96 and is impelled in either direction by hydraulic fluid conducted to the cylinder through conduits 97 and 98 preferably under the control of the valve 54.

The mounting of the cylinder 96 is preferably by oppositely extending trunnions 99 rotatably journaled in mounting plates 101 welded to a box beam 102 extending transversely between the side plates 32 and 33 but materially spaced above the carrier bottom 28 in order to provide a rear discharge opening, defined by the box beam 102, the side plates 32 and 33, and the carrier bottom 28.

When the piston rod 94 is suitably actuated by the hydraulic fluid, the barrier 71 is moved forwardly or rearwardly to any selected position and, if moved forwardly, is effective to sweep material before it across the bottom 28 and over the blade 31 and, if moved rearwardly, is effective to sweep material behind it either along the bottom 28 or so far to the rear as to discharge it under the beam 102. Also, if the barrier 71 is moved through its arcuate path 88 to its uppermost position, it is lifted out of the way of the charging or discharging material passing over the cutting edge 31.

In the usual operation, the cutting blade 31 accumulates as much earth as possible on the forward portion of the carrier bottom 28, and, just prior to the time when the accumulation of material ceases due to the inability of the oncoming material to displace the already accumulated material, the barrier 71 is actuated from its substantially horizontal position downwardly and rearwardly along the carrier bottom 28, to displace the load which occupies substantially the forward half of the carrier bottom, into a new location occupying approximately the rearward half thereof. The barrier can remain in an intermediate position or can be returned to its raised, substantially horizontal position while the cutting edge 31 accumulates a second or subsequent load of material on the forward portion of the carrier bottom 28.

Following this accumulation, the barrier 71 can be lowered and utilized by a rearward movement to discharge some or all of the material over the rear edge of the carrier bottom 28. If the barrier 71 has been left in a position between the two loads, it can be moved rearwardly and then forwardly, or vice versa, in order to discharge the two loads in their respective directions. By the use of this arrangement, therefore, the carrying capacity of the carrier is substantially doubled over presently feasible practice, and, furthermore, the direction of discharge can be arranged to suit individual requirements.

In order still further to increase the carrying capacity of the arrangement, I preferably provide an apron 103 which is constituted of a generally arcuate plate 104 contoured to follow, but to lie outside of, the path of the barrier 71, and likewise includes a pair of side plates 106 and 107 which are suitably joined to the arcuate plate 104. The apron side plates extend preferably outside of the side plates 32 and 33, and are pivotally mounted thereon by pivot pins 108. Preferably, the side plates 106 and 107 have a greater arcuate extent than the plate 104, so that, even when the apron 103 is pivotally rotated about the pivots 108 so as to be spaced from the cutting blade 31, the sides 106 and 107 cooperate with the sides 32 and 33 to provide a continuous wall against the lateral escape of accumulated material.

Actuation of the apron 103 is preferably accomplished by a pair of piston rods 109, each of which is connected by a pivot pin 110 to its respective side plate 106 or 107, and which is likewise fastened to a piston (not shown) operating within a cylinder 111 carrying a trunnion 112 journaled in a suitable boss 113 projecting from an upstanding ear 114 on the respective one of the side plates 32 or 33. Hydraulic fluid is suitably supplied to the cylinders by conduits 116 and 117, preferably under the control of the valve 54 and arranged so that the piston rods 109 both operate in unison to rotate the apron 103 in a clockwise or in a counter-clockwise direction.

Ordinarily, the apron is raised to afford access over the blade 31, but when the carrier bottom 28 has a substantial load thereon the gathering material tends to roll forwardly and discharge ahead of the edge 31. Prior to this occurrence, the apron 103 is rotated clockwise, as seen in Fig. 2, into close proximity to the blade 31 to catch or confine such material, so that the cutting blade 31 then acts somewhat as a plane, discharging material ahead of it into the apron 103. Dumping material from the apron is effected by actuating the piston rods 109 to rotate the apron 103 counter-clockwise, as seen in Fig. 2, and permitting the contained material to discharge gravitally over the edge of the plate 104.

In the form of my invention shown in Figs. 3 to 9, inclusive, there is provided an earth mover adapted primarily for a larger carrying capacity than the structure disclosed in Figs. 1 and 2, but which in the main follows the same general principles of the invention. The structure includes a pair of front ground-engaging wheels 207, each mounted at the extremity of a steering axle 208 provided with a draft connection (not shown) to any suitable draft mechanism, such as a tractor, and centrally provided with a pivot 209 for articulation with a horn 211 extending from a transverse yoke beam 212 which spans the distance between side frame members 213 and 214. The side members are preferably of open truss construction, including a top chord 216 and a bottom chord 217 with intermediate braces 218. The top and bottom chords adjacent their rearward end merge in a pair of mounting plates 219 carrying a sleeve 221. Passing through the sleeves 221 on opposite sides of the vehicle is a cross pivot tube 222 adjacent each end carrying a pair of mounting plates 223 and 224. Projecting from these pairs of plates are stub axles 226 mounting ground-engaging wheels 227 preferably provided with pneumatic tires.

Figure 3:
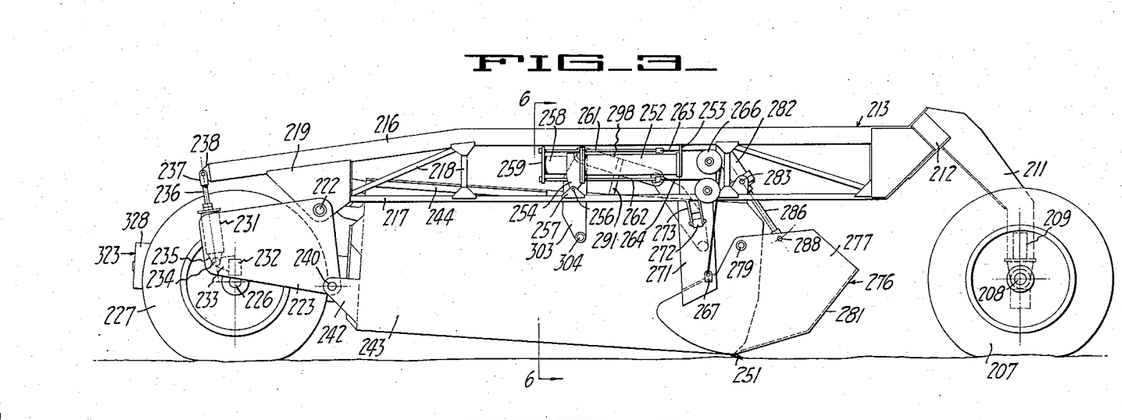
Fig. 3 is a side elevation of a modified form of earth mover in accordance with my invention.
Figure 5:
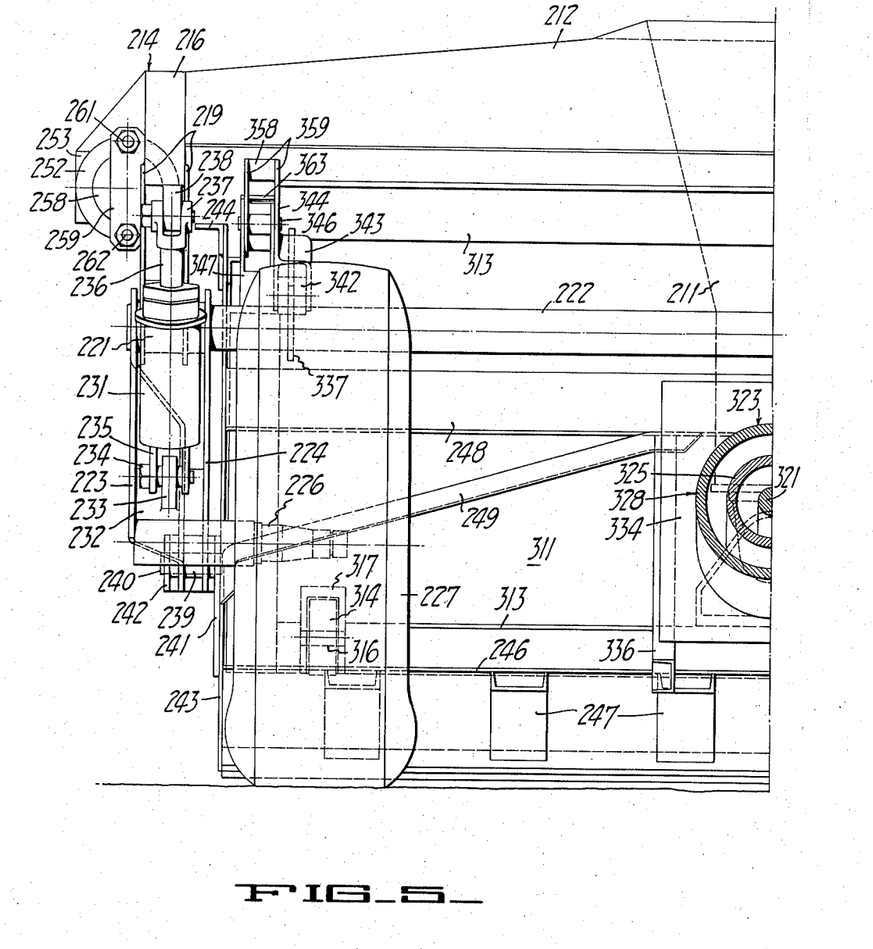
Fig. 5 is a rear elevation of one-half of the modified form of earth mover of Fig. 3, a portion being shown in cross-section.
Figure 6:
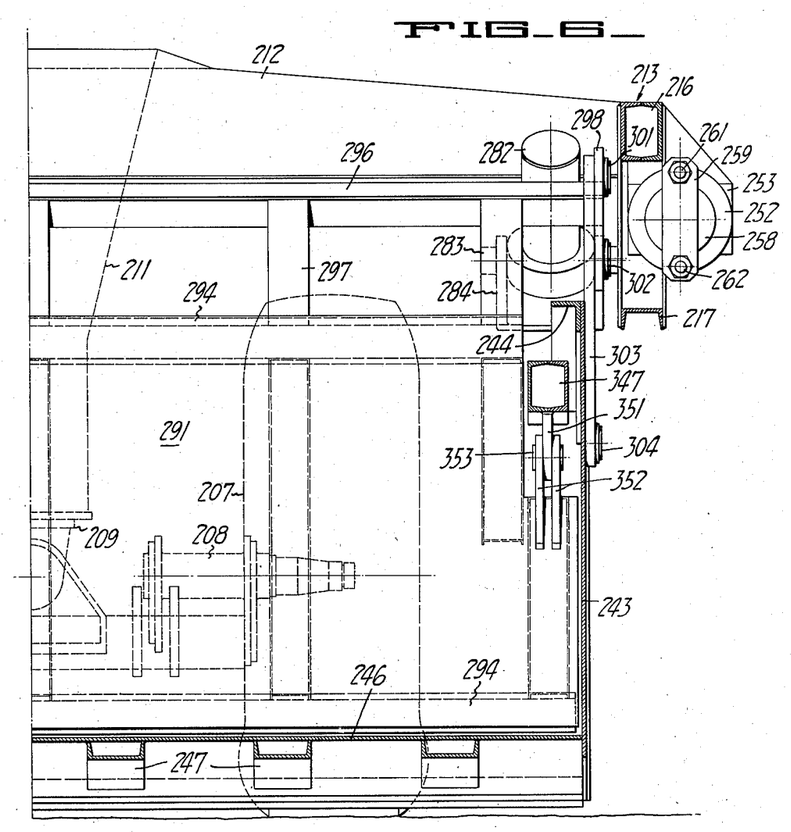
Fig. 6 is a cross-section of one-half of the modified form of earth mover of Fig. 3, the plane of section being indicated by the line 6—6 of Fig. 3.

In order properly to relate the ground-engaging wheels and the framework so as to vary the distance between the framework and the ground, one each side of the structure I interpose a hydraulically expansible cylinder 231 between the axle 226 and the framework. Between the plates 223 and 224 is positioned a block 232 carrying an apertured ear 233 to which a pivot pin 234 connects a pair of similarly apertured ears 235 projecting from the cylinder 231. A piston (not shown) is disposed within the cylinder and is connected to a piston rod 236 which projects from the cylinder and at its upper end carries a yoke 237 straddling an apertured lug 238 fastened to the end of the chord 216.

When hydraulic fluid is suitably introduced into the cylinders 231 on both sides of the vehicle, the vertical spacing between the frame 213 and the ground is varied in accordance with the desires of the operator. The described vehicle or carriage arrangement is readily fabricated of the usual structural shapes, preferably united by welding, and affords a very light, although quite strong, frame for the support of the relatively heavy loads which the earth mover is designed to carry. The hydraulic cylinders provide a nice control of the position of the frame with respect to the ground, and the wheels can all quite readily be removed for installation of a different type of ground-engaging member or for repairs if necessary.

In accordance with my invention, I provide means on the frame for retaining material such as excavated earth. Adjacent their forward end, the plates 223 and 224 are preferably brought closely together and are secured to a sleeve 239 in which a pivot pin 240 is mounted. Engaging the pivot pin are a pair of ears 241 and 242 which are joined to their adjacent one of a pair of carrier sides 243. Each carrier side is preferably a planar sheet of metal arranged with its plane generally vertical and having a generally rectangular outline. The upper edge of the side is reinforced by a pair of angle irons 244, while the lower edge of each side merges with a carrier bottom 246. The bottom is preferably a sheet of metal of planar contour, reinforced by channels 247 which are welded thereto at appropriate intervals and which extend longitudinally of the carrier bottom. The carrier sides 243, together with the carrier bottom 246, afford a receptacle for the retention of excavated material. Preferably, the sides 243 are reinforced adjacent their rear edges by a transverse beam 248 conveniently fabricated of a pair of channels welded together and to the side plates and are additionally reinforced by angle irons 249 extending from the side plates 243 to the beam 248 adjacent the center thereof.

The leading edge of the carrier bottom 246 is preferably provided with a cutting blade 251, detachably secured in place and preferably inclined downwardly in the direction of advance of the structure so that the cutting blade will detach earth from the surface of the ground as the earth mover advances and will discharge such removed earth onto the carrier bottom between the sides 243. In order to regulate the depth of cut of the blade 251, I preferably provide means for raising and lowering the forward portion of the carrier bottom 246 with respect to the framework independently of the raising and lowering effect of the cylinders 231 on the framework, which latter are particularly effective to raise and lower the rearward portion of the carrier bottom and to change the angle of the cutting edge 251.

Figure 4:
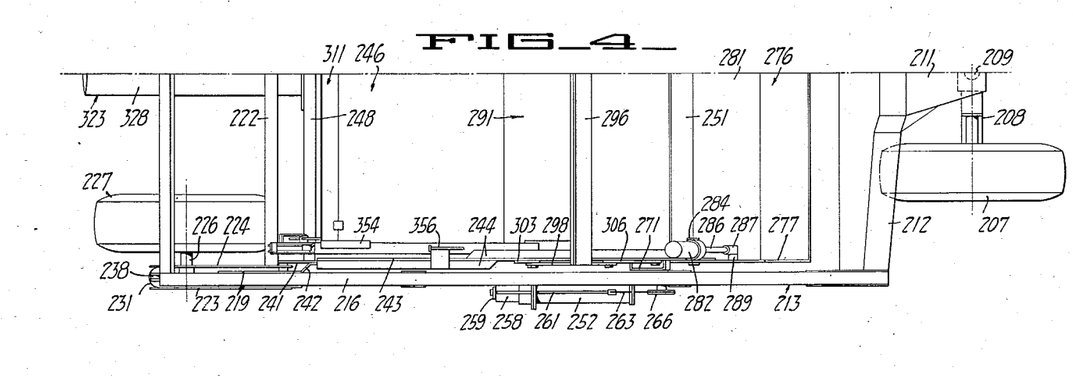
Fig. 4 is a plan of one-half of the modified form of earth mover of Fig. 3.

To move the forward part of the carrier, I mount on each side of the framework, preferably between the upper chord 216 and the lower chord 217, one of a pair of hydraulic cylinders 252 the forward end of which is connected to a plate 253 depending from the upper chord 216. The rearward end of the cylinder is provided with a collar 254 which is conveniently connected by a pivot pin 256 to a bracket 257 on the lower chord 217. Projecting from the cylinder is a plunger 258 carrying a cross-head 259. Secured to the cross-head are rods 261 and 262 passing through guides in the yoke 254 and connected at their ends to pull cables 263 and 264 each of which passes over its respective one of a pair of pulleys 266 pivotally mounted on the side of the frame. The cables 263 and 264, after passing over their respective pulleys, engage an apertured ear 267 which is fastened to the adjacent side plate 243. The cables are fastened to the bracket 267 for slight movement to compensate for any slight differences in stretching or other inequality in order that the thrust of the plunger 258 will be uniformly transmitted to the side member 243.

When the two plungers 258 at opposite sides of the frame are operated simultaneously through their intercommunicating hydraulic connections, the cables 263 and 264 are simultaneously withdrawn, lifting the sides 243, as well as the bottom 246, about the pivot 240 as an axis. While the operation of the cylinders 231 in effecting pivoting around the tube 222 produces a slight fore-and-aft movement of the pivot axis 240, this movement is not objectionable and is compensated for by the cables 263 and 264. In order, however, to prevent excessive strain on the pivots and transverse movement of the earth carrier with respect to the frame, each of the side plates 243 carries a rub iron 271 against which a roller 272 operates. The roller is carried in a fork 273 depending from the lower chord 217.

As the earth mover is advanced into the material to be excavated and the material piles up on the carrier bottom 246, the material forms a pile of approximately a predetermined magnitude and then begins to spill forwardly in advance of the cutting edge 251. To prevent the loss of such material and to increase the excavating capacity of my earth mover, I preferably provide a front apron, generally designated 276, to catch the forwardly spilling excavated material. Pivotally mounted on the outside of each of the side plates 243 is an apron side 277 pierced by a pivot pin 279 likewise piercing the adjacent side plate 243. The two apron sides are joined by an apron bottom 281 welded to the sides and bent to approximate an arcuate contour. The bottom 281 does not extend for the full contour of the apron sides, so that when the apron 276 is in its lowermost position the rearward edge of the bottom 281 closely approaches the edge 251, while the apron sides 277 overlap the carrier sides 243. In this fashion the apron can be moved about the pivot 279 to space the rearward edge of the bottom 281 a material distance from the cutting edge 251, yet the side plates 277 still overlap the carrier sides 243 and prevent spilling of material therebetween.

The rotary or pivotal movement of the apron 276 is preferably effected by a pair of hydraulic cylinders 282, each of which is provided with trunnions 283 mounted in upstanding ears 284 projecting from the upper edge of the carrier sides 243. Extending from the pivotally mounted cylinders 282 are piston rods 286 each of which terminates in a head 287 through which a pivot pin 288 passes to engage a boss 289 projecting inwardly from its respective apron side 277. The cylinders 282 are preferably hydraulically interconnected under control of the operator, so that when they are actuated in either direction the piston rods 286 positively rotate the apron 276 about the pivots 279.

In order to increase the capacity of the earth mover and to delay the necessary operation of the apron 276 as much as possible, I preferably provide means for moving rearwardly an accumulated pile of excavated material resting on the bottom 246 and which is of too great magnitude to be moved rearwardly by freshly excavated material being added by the forward movement of the vehicle. The size of this pile of excavated material varies somewhat in accordance with the material being excavated and the power being applied to the earth mover; yet in every instance the power necessary to excavate the material is considerably greater than that required simply to carry it. By providing the means for removing the accumulated pile bodily away from the cutting edge, I increase the capacity of the earth mover by a considerable amount.

To effect such movement of an accumulated pile of material, I provide an earth barrier, generally designated 291, preferably fabricated of a pair of metal plates 292 and 293 suitably joined to a framework of channels 294. This generally planar structure extends substantially transversely between the sides 243 and from a point adjacent the carrier bottom 246 to a point adjacent the top of the sides. The barrier is mounted so as to be out of the way and inactive when the earth mover is first excavating a load and to come into operation subsequently.

For this reason the barrier framework 291 is preferably extended upwardly above the sides 243 to join a cross-beam 296 to which the barrier is likewise connected by braces 297. The cross-beam itself at its extremities is rigidly mounted on a pair of longitudinal links 298 at their opposite ends provided with pivot pins 301 and 302 forming part of a parallel link motion. The pivot pin 301 likewise pierces a link 303 the lower end of which is held by a pivot pin 304 on one of the side plates 243. The pivot pin 302 pierces a forward link 306 at its lower end encompassing a pivot pin 307 also mounted on one of the side plates 243.

The relationship of the various pivots 301, 302, 304 and 307, as well as the link 298, 303 and 306, is such as to afford a generally parallel movement for the barrier 291. That is to say, the lower edge of the barrier follows substantially a rectilinear path in close proximity to the carrier bottom 246 until it has traversed a path from substantially the center of the carrier bottom to the cutting edge 251. After leaving a point adjacent the cutting edge, the linkage is such that the barrier swings in approximately an arcuate path, forwardly and upwardly, to be spaced away from the cutting edge and to interfere in no wise with the access of excavated material to the bottom 246. This position is shown in Fig. 9.

Figure 8:
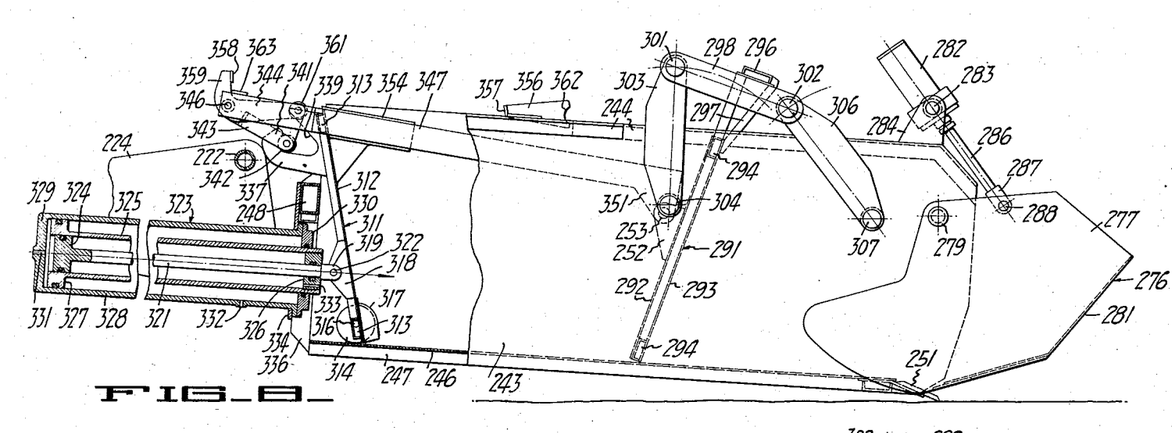
Fig. 8 is a side elevation, with portions omitted and parts in cross-section, of the earth mover of Fig. 3 in one position.
Figure 9:
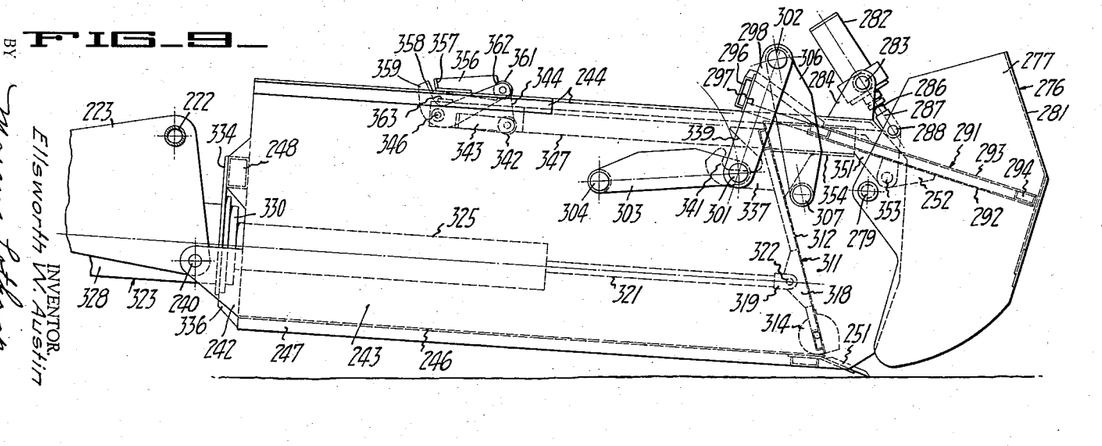
Fig. 9 is a view similar to Fig. 8 but showing the parts of the earth mover in a different position.

The earth is loaded when the barrier is in its Fig. 9 position until such time as the maximum load has been piled up on the forward half of the carrier bottom 246. Then the barrier 291 is actuated in a downward and rearward direction and, since it assumes substantially an upright position adjacent the cutting edge 251, engages the lower forward portion of the pile of excavated material. As the barrier progresses rearwardly it moves the accumulated pile of material rearwardly from a position occupying substantially the forward half of the bottom 246 to a position occupying substantially the rearward half of the bottom 246. The barrier then comes to rest substantially in its Fig. 8 position, approximately midway between the forward edge of the carrier and the rearward edge thereof.

With the barrier at rest in such intermediate or generally central position, the forward portion of the bottom 246 is freed of material and is available for a subsequent pile of generally predetermined magnitude to be excavated by the cutter blade 251. A subsequent pile of material is accumulated and when forward spillage begins to occur the apron 276 is operated as previously described, so that in effect approximately three loads of predetermined magnitude can be excavated and disposed of on the earth mover without necessitating that the cutter blade 251 work against more than a single load of predetermined magnitude at any time.

In the discharge of the material so accumulated, the apron 276 is first lifted to release its retained load over the cutting edge 251 which has previously been lifted from the surface of the ground, and then the barrier 291 is moved forwardly in order to push the subsequently accumulated material ahead of it for discharge over the lifted cutting edge 251. This leaves for discharge the accumulated material which previously has been forced by the barrier 291 rearwardly onto the rearward portion of the bottom 246.

To discharge the remaining accumulated material and to provide an appropriate manner of actuation for the barrier 291, I mount a transverse, movable wall 311 between the sides 243 to extend from a point adjacent the bottom 246 to a point adjacent the upper edge of the sides. The wall 311 preferably is a planar sheet 312 of material which is suitably reinforced by channels 313. Most of the weight of the wall 311 is borne upon a pair of rollers 314 sustained by mounting axles 316, the forward portions of the rollers being provided with suitable shrouds 317. The wall is provided with a pair of wings 318 between which is mounted the apertured end 319 of a piston rod 321, the connection being effected by a pivot pin 322.

The piston rod 321 is part of a telescoping, double-acting, hydraulic expansible chamber assembly, generally designated 323, which comprises the piston rod 321 carrying a piston 324 at its inner end, the piston operating in a sleeve 325 one end of which is sealed by a ring 326 and the other end of which is enlarged to provide a piston 327. This latter piston reciprocates in a cylinder 328, closed at one end by a head 329 and sealed at the other end by a ring 330. Pressure fluid is admitted to the assembly through a connection 331 and joined connections 332 and 333, all extending to a suitable supply of hydraulic fluid and control mechanism which likewise controls the hydraulic cylinders 231, 252 and 282. The cylinder 328 is preferably mounted on the cross-beam 248 by means of a plate 334 also secured to a pair of upright channels 336 fastened to the carrier bottom 246.

When the telescoping cylinder assembly 323 is actuated in either direction, the wall 311 is advanced and retracted along the bottom 246 between its rearmost position adjacent the cross-beam 248 to its foremost position adjacent the cutting edge 251, so that the entire carrying space between the bottom 246 and the sides 243 is swept out or positively displaced by operation of the wall 311.

Figure 7:
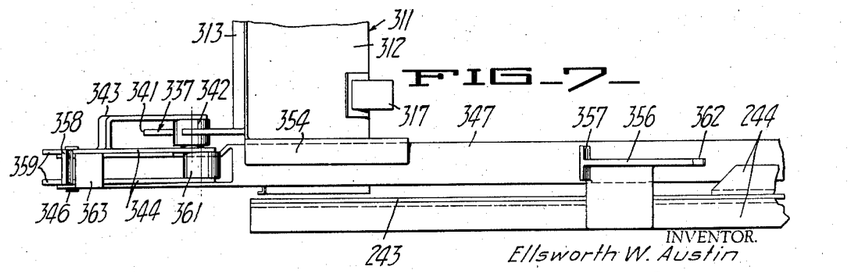
Fig. 7 is a plan showing in detail part of a latch mechanism of the earth mover of Fig. 3.

In accordance with the invention, the operation of the wall 311 and the operation of the barrier 291 are preferably coordinated so that the barrier and the wall can be operated simultaneously or in synchronism, and so that the wall 311 can be operated independently of the operation of the barrier 291. For this reason the wall 311 is provided adjacent each side extremity thereof, near the top part of the framework 311, with a pair of latch hooks 337 appropriately cut out of plate material and forming a somewhat triangular enclosed space having an opening adjacent an inclined cam face 339 arranged opposite the hook 341.

Engaged with the hook 341, in the position of the structure shown in Fig. 8, is a roller 342 at the extremity of a lever 343 secured to a bell crank 344 mounted on a pivot pin 346 at the rear end of its respective one of a pair of struts or push beams 347 conveniently fabricated of a pair of facing channels welded together. The forward end of each of the push beams 347 is provided with a depending web 351 which projects between a pair of apertured ears 352 upstanding from the rear plate 292 of the barrier 291 and connected therewith by a pivot pin 353. The forward end of the push beams 347 is thus supported on the barrier 291 and ultimately on the side plates 243 through the links 303 and 306, while the weight of the rearward portion of each push beam 347 is carried through the pivot pin 346 and the bell crank 344 and the lever 343 to the hook plate 337 on the wall 311, as well as by a guide channel 354 fixed on the wall 311 and slidably engaging the push beam 347.

When the piston rod 321 is extended from the cylinder assembly 323, the wall 311 is moved forwardly, the hook plates 337, being in engagement with the rollers 342, transmit their motion through the pivot pins 346 and the push beams 347 to move the barrier 291 forwardly and finally upwardly to the position of the barrier shown in Fig. 9. But this position of the barrier is attained when the wall 311 is only about half way of its forward travel. Consequently, I provide means for disengaging the wall 311 from the barrier 291 so that the barrier can be left in its uppermost or Fig. 9 position while the wall 311 completes its forward travel.

At an appropriate location the angles 244 are provided with abutment plates 356, each of which on its rearward face is formed with an outturned lug 357 in the path of a bumper 358 spanning the arms 359 of the bell crank 344. When the push beams 347 have been moved sufficiently far forward, the bumpers 358 come into contact with the lugs 357, thereby impelling the rotation of the bell cranks 344 about their pivots 346 in an anti-clockwise direction, as seen in Fig. 8, until such time as each of the rollers 342 is lifted from its respective hook 341.

Simultaneously with this action, and in order to provide a means for holding the push beams 347 in position, a suitable roller 361 on each of the bell cranks 344 comes into engagement with an accommodating notch 362 on the forward edge of the plate 356, so that as the roller 342 is moved upwardly out of engagement with the hook 341, the roller 361 is moved into engagement with the retaining notch 362. The push beams 347 are appropriately supported in this manner even though the hooks 337 have been disengaged therefrom. By this operation, the wall 311 is freed from the push beams 347 and the barrier 291 is held in its upwardly, extended position, the weight of the barrier tending to force the rollers 361 into the notches 362. Further extension of the piston 321 from its unlatching or intermediate position is effective to impel the wall 311 farther forwardly to complete the discharge of material from the carrier bottom 246.

When the discharge has been completed and the hydraulic connections to the cylinder assembly 323 are reversed to retract the piston rod 321, the wall 311 is moved rearwardly to substantially an intermediate position whereat the opening in the hook plates 337 receives the rollers 342. Each cam face 339 rotates the roller 342 and the bell crank 344 about the pivot 346, until the roller is seated in the lower portion of the hook plate and the roller 361 is withdrawn from its notch 362. Further clockwise rotation (as seen in Fig. 9) of the bell crank 344 is prevented by a stop 363 on the push beam 347 which abuts the arms 359.

Since further rotation of the bell crank is precluded, continued rearward movement of the wall 311 and the hook plates 337 transmits a force through the bell cranks 344 and the pivot pins 346 to the push beams 347, so that they in turn rotate and impel the barrier 291 to its rearmost position and the wall 311 is virtually in its own rearmost position. Final rearward movement of the barrier 291 is effected by the subsequent ingress of excavated material to restore the roller 342 from a forward position in the hook plate 337 to a rearward position therein, as shown in Fig. 8.

I claim:

1. An earth mover comprising a frame, ground-engaging members for supporting said frame, a carrier bottom mounted on said frame, carrier sides merging with said bottom, an earth barrier between said sides, supporting links pivoted to said barrier and to said sides, and means supported by said frame and connected to said barrier for positively moving said barrier in both directions along said bottom and out from between said sides in an arcuate path.

2. An earth mover comprising a carrier bottom, carrier sides upstanding from said bottom, an apron pivotally mounted on said sides and rotatable toward and away from said bottom, an earth barrier mounted on said sides by pivoted links, and means for moving said barrier from a first position adjacent said bottom to a second position away from said bottom and adjacent said apron.

3. An earth mover comprising a frame, ground-engaging members for supporting said frame, a carrier bottom and carrier sides defining a space and mounted to pivot on said frame, means for moving said carrier bottom and carrier sides with respect to said frame, an earth barrier extending between and movably mounted on said sides, an apron defining a space and extending across one end of said bottom and movably mounted on said sides, means for moving said apron with respect to said bottom, and means for moving said barrier through the space defined by said bottom and sides and through the space defined by said apron.

4. An earth mover comprising a frame, ground-engaging members for supporting said frame, a carrier bottom mounted on said frame and adapted to support earth, an earth barrier supported from said frame and movable along said bottom to dislodge earth supported thereupon, a wall movably supported from said frame and extending across said bottom, and means for moving said wall along said bottom to dislodge other earth supported thereupon.

5. An earth mover comprising a frame, ground-engaging members for supporting said frame, a carrier bottom mounted on said frame and adapted to support earth, an earth barrier supported from said frame and movable along said bottom to dislodge earth supported thereupon, a wall supported from said frame and movable along said bottom to dislodge other earth supported thereupon, and means for moving said earth barrier and said wall in unison.

6. An earth mover comprising a frame, a carrier bottom supported from said frame and adapted to support earth, an earth barrier supported from said frame and extending across and movable along said bottom to dislodge earth supported thereupon, a wall supported from said frame and extending across and movable along said bottom to dislodge other earth supported thereupon, and means for moving said barrier and said wall separately and together.

7. An earth mover comprising a frame, a carrier bottom supported from said frame and adapted to support earth, an earth barrier supported from said frame and movable along said bottom to dislodge earth thereupon, a wall supported from said frame and movable along said bottom to dislodge other earth thereupon, means for moving said wall, and means for releasably coupling said barrier for movement in unison with said wall.

8. An earth mover comprising a frame, ground-engaging members for supporting said frame, a carrier bottom and carrier sides movably mounted on said frame and adapted to support earth, means for moving said carrier bottom and said carrier sides with respect to said frame, an earth barrier supported from said frame and extending between said carrier sides and movable along said bottom to dislodge earth thereupon, a wall supported from said frame and extending between said carrier sides and movable along said bottom wall to dislodge other earth thereupon, means for releasably coupling said barrier and said wall, and means for moving said coupled barrier and wall.

9. An earth mover comprising a frame, ground-engaging members for supporting said frame, a carrier bottom mounted on said frame and adapted to support earth, an earth barrier supported from said frame and movable along said bottom to dislodge earth thereupon, a wall supported from said frame and movable along said bottom to dislodge other earth thereupon, means for moving said barrier, and means for moving said wall.

10. An earth mover comprising a frame, ground-engaging members for supporting said frame, a carrier bottom mounted on said frame and adapted to support earth, an apron mounted to move toward and away from one end of said bottom, means for moving said apron, an earth barrier adapted to discharge earth upon said bottom supported from said frame and movable from a position adjacent said bottom to a position adjacent said apron, means for moving said barrier, a wall supported from said frame and movable along said bottom to discharge earth thereupon, and means for coupling said wall and said barrier for movement in unison.

11. An earth mover comprising a frame, ground-engaging members for supporting said frame, a carrier bottom movably mounted on said frame, means for moving said bottom with respect to said frame, a pair of substantially parallel carrier sides upstanding from said bottom, an apron extending across one end of said bottom and pivotally mounted on said sides, means for pivoting said apron on said sides, a wall supported from said frame and extending across said bottom adjacent the other end thereof, means for moving said wall along said bottom between said sides, an earth barrier supported from said frame and extending across said bottom between said sides and intermediate said wall and said apron, and means for coupling said barrier for movement in conjunction with said wall.

12. An earth mover comprising a frame, ground-engaging members for supporting said frame, an earth carrier including a carrier bottom mounted on said frame, an earth barrier, pairs of links connecting said barrier and said carrier, the links of each of said pairs being connected by laterally spaced pivots at one end to said barrier and by laterally spaced pivots at the other end to said carrier, the axes of all of said pivots being parallel to constrain said barrier to movement in substantially a rectilinear path along said bottom and then arcuately into a position spaced from said bottom, and means connected to said barrier and to said carrier for positively moving said barrier in both directions.

13. An earth mover comprising a frame, ground-engaging members for supporting said frame, an earth carrier including a carrier bottom mounted on said frame, an earth barrier, a plurality of identical pairs of links joined to said barrier and said carrier at laterally spaced points by pivotal connections, the axes of said connections being parallel, and means connected to said barrier and to said carrier for moving said barrier in both directions along said bottom.

14. An earth mover comprising a frame, ground-engaging members for supporting said frame, a carrier bottom mounted on said frame, carrier sides merging with said bottom, an earth barrier disposed between said sides, a pair of links, pivots having spaced parallel axes connecting adjacent ends of said links to said barrier, pivots having spaced axes parallel to said axes connecting the other ends of said links to said carrier sides, and means for moving said barrier over said bottom.

15. An earth mover comprising an earth carrier including a carrier bottom, an earth barrier, and a plurality of pairs of links pivoted to said carrier and to said barrier, the pivots of said pairs being on four parallel axes, for supporting said barrier on said carrier for movement along said bottom.

16. An earth mover comprising a carrier bottom, a carrier side attached to and upstanding from said bottom, an earth barrier disposed adjacent said side and said bottom, and a pair of links having their corresponding ends pivoted to said side to turn about parallel axes and their other ends pivoted to said barrier to turn about parallel axes.

17. An earth mover comprising a pair of substantially parallel sides, an earth barrier extending between said sides, a first pair of links pivoted to one of said sides at spaced points and to said barrier at spaced points, and a second pair of links pivoted to the other of said sides at spaced points and to said barrier at spaced points.

18. An earth mover comprising a carrier having a pair of sides, an earth barrier extending between said sides, and means including a pair of links pivoted at one end to one of said sides at spaced points and at the other end to said barrier at spaced points for mounting said barrier on said sides to move in substantially a rectilinear path.

19. An earth mover comprising a pair of side supports, an earth-sustaining member extending between said side supports, a first pair of links pivoted to one of said side supports at spaced points and to said earth-sustaining member at spaced points, and a second pair of links pivoted to the other of said side supports at spaced points and to said earth-sustaining member at spaced points.

20. An earth mover comprising a frame, ground-engaging means for supporting said frame, a carrier bottom mounted on said frame and adapted to support earth, an earth-sustaining member supported from said frame and movable with respect to said bottom to discharge earth, a wall supported from said frame and movable with respect to said bottom to discharge other earth supported thereupon, and push beams joined to said member and to said wall for moving said earth-sustaining member and said wall in unison.

21. An earth mover comprising a frame, ground-engaging means for supporting said frame, a carrier bottom mounted on said frame and adapted to support earth, an earth-sustaining member supported from said frame movable with respect to said bottom to discharge earth, a wall supported from said frame and movable with respect to said bottom to discharge other earth, and struts directly connected to said member and to said wall for moving said earth-sustaining member and said wall in unison.

22. An earth mover comprising a frame, ground-engaging means for supporting said frame, a carrier bottom mounted on said frame and adapted to support earth, an earth-sustaining member supported from said frame movable with respect to said bottom to discharge earth, a wall supported from said frame and movable with respect to said bottom to discharge other earth, and push beams pivoted to said earth-sustaining member and mounted on said wall for moving said member and said wall conjointly.

ELLSWORTH W. AUSTIN.